United States Patent [19]

Gaspar

[11] 4,434,561

[45] Mar. 6, 1984

[54] LEVEL INDICATOR

[76] Inventor: Michael E. Gaspar, 115 W. Willow St., Newberry, Mich. 49868

[21] Appl. No.: 312,615

[22] Filed: Oct. 19, 1981

[51] Int. Cl.³ .............................................. G01C 9/06
[52] U.S. Cl. ........................................ 33/366; 33/367
[58] Field of Search ................. 340/686, 689; 33/366, 33/377, 367; 250/577, 231 R

[56] References Cited

U.S. PATENT DOCUMENTS

| | | | |
|---|---|---|---|
| 1,216,129 | 2/1917 | Jenning | 33/367 |
| 1,955,315 | 4/1934 | Styer | 73/313 X |
| 2,547,310 | 4/1951 | Flint | 33/366 |
| 3,118,088 | 1/1964 | Hanson | 33/367 X |
| 3,172,212 | 3/1965 | Papas | 33/206 |
| 3,223,249 | 12/1965 | Cady | 33/366 X |
| 3,371,424 | 3/1968 | Sweet | 33/206 |
| 3,651,581 | 3/1972 | Lehman | 33/367 |
| 3,816,947 | 6/1974 | Taylor | 33/367 X |
| 3,842,512 | 10/1974 | Stoltz et al. | 33/378 X |
| 3,947,692 | 3/1976 | Payne | 250/577 |
| 4,028,260 | 6/1977 | Zuest | 252/62.2 |
| 4,079,521 | 3/1978 | Uhorczak | 33/366 |
| 4,110,609 | 8/1978 | Beer | 250/231 |
| 4,223,231 | 9/1980 | Sugiyama | 250/577 |

FOREIGN PATENT DOCUMENTS 2924483  1/1981  Fed. Rep. of Germany ........ 33/366

Primary Examiner—Harry N. Haroian
Attorney, Agent, or Firm—John F. Rohe

[57] ABSTRACT

A device and method for locating two or more points on a horizontal plane is disclosed. The device emits an audio or visual signal when fluid in a tube reaches a designated level. When the signal is given, the fluid at the other end of the tube will be on the same horizontal plane, thereby enabling the user to locate points on the horizontal plane.

5 Claims, 6 Drawing Figures

U.S. Patent   Mar. 6, 1984   4,434,561
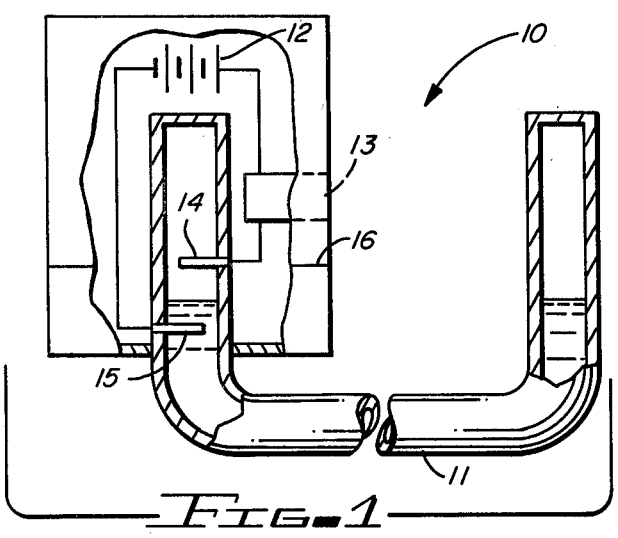
_FIG.-1_
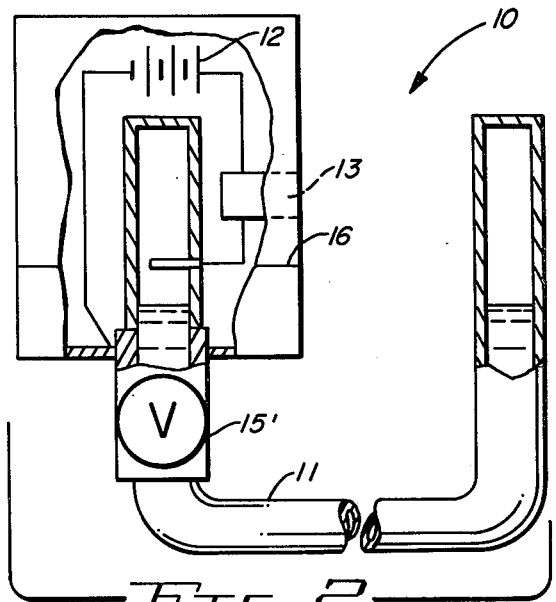
_FIG.-2_
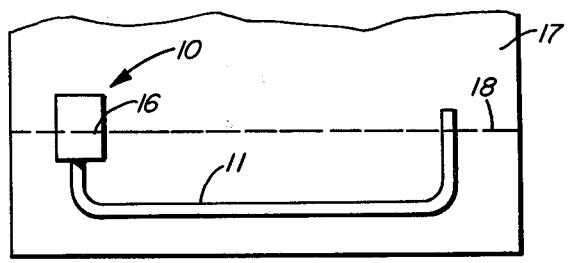
_FIG.-3_
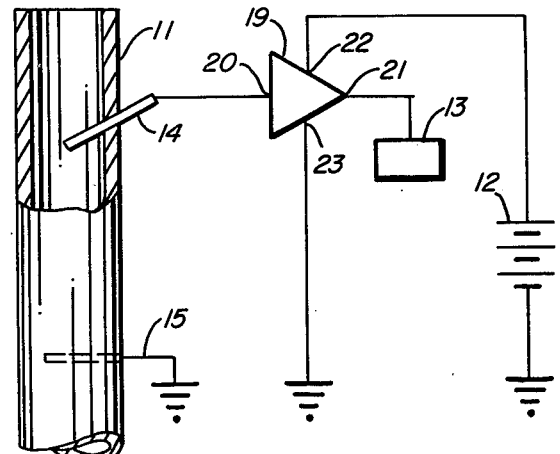
_FIG.-4_
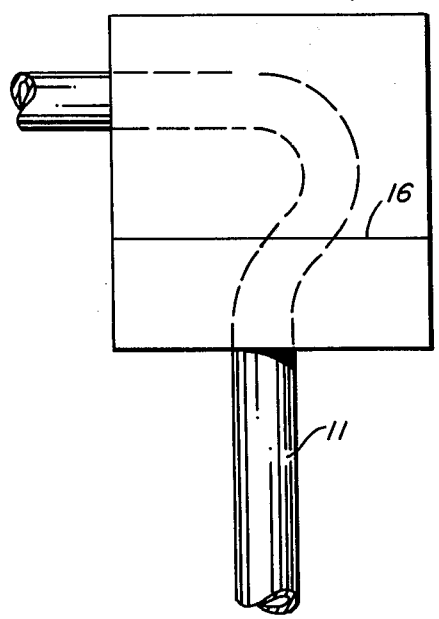
_FIG.-5_
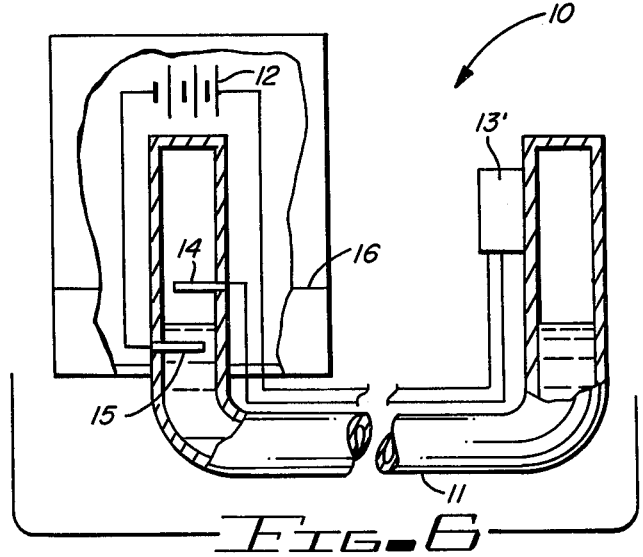
_FIG.-6_

LEVEL INDICATOR

TECHNICAL FIELD

This Application relates generally to devices which may be used in identifying two or more points on a horizontal plane or line. More particularly, the invention pertains to a fluid actuated switch or signal at one end of a water tube, when used in the surveying, carpentry or construction industry.

BACKGROUND OF THE INVENTION

In the past, numerous devices have been utilized in identifying two or more points on a horizontal plane. Such devices have been used to assure that the foundation for a home is level, to properly place a suspended ceiling, to lay a level concrete floor, swimming pool, sewer line, landscape, deck, fence, bridge and other structures which are intended to be level.

In the surveying industry there are sophisticated optical scopes and electronic levels available, however these items are quite costly, cumbersome and difficult to operate. In the carpentry industry it is seldom practical or financially feasible to justify the acquisition of these tools. In this field, the prior art included the utilization of a clear plastic tube having an inner diameter of approximately ¼ inch, which is partially filled with water. In establishing a level for a suspended ceiling, opposite ends of the tube would be held by two workers. A reference point would be established at one point along the ceiling. One worker would hold the tube so that the water level in the tube would be aligned with this reference point. This is known as the reference end of the tube. The other worker, at what is known as the working end of the tube, would mark points around the room, which would also align with the water level. Since water seeks its own level, all marked points around the room would be level with the reference point. It should be noted that in order to accomplish this function, two separate workers are required, each being at opposite ends of the tube.

Where only one worker was available, it was known in the prior art that the tube utilized could be marked with tape at the working end, at the level of the reference point. The procedure would be as follows. Firstly, one end of the tube would be affixed to a wall with the water level aligned with the reference point. This would, of course, be the reference end of the tube. Secondly, a piece of tape, or other marking, would be placed at the corresponding level of water at the working end of the tube. Thirdly, the sole carpenter would then identify points around the room where the water level would reach the tape on the working end of the tube. A level area would thus be located. There were shortcomings with this approach in that if any water inadvertently spilled out, a corresponding degree of inaccuracy would be achieved. Also, if throughout operations, there were temperature changes effectuated, for example, by sunlight, the volume of fluid would expand or contract and thereby adversely affect the accuracy of the results.

Also known to the prior art were line levels which involved stretching lines around the perimeter and across the area to be levelled. The taut lines would be levelled by use of the bubble type spirit line levels. The taut lines were not without disadvantages. They were quite inaccurate; were difficult to use in that lines would be placed in many locations; they required two individuals to operate, one to look at the line level and the other to adjust the end of the line; and finally, they were not of universal application because they could only operate to the extent of the one's line of sight, as they could not be used to negogiate corners or go under passageways.

It would appear advantageous to provide a levelling device which is accurate, inexpensive, durable, simple to operate, not adversely affected by temperature changes, capable of functioning around corners, through or under passageways beyond one's line of sight, and which can be operated by one worker.

SUMMARY OF THE INVENTION

In accordance with the foregoing background discussion, it is the object of this invention to provide a levelling device which is accurate, inexpensive, durable, simple, immune to temperature changes, capable of functioning beyond one's line of sight and which can easily be operated by one worker.

With the foregoing in mind, a level indicator and method of utilizing the same is disclosed and claimed herein. The indicator is an apparatus for detecting a fluid level to which a tube partially filled with fluid is attached. The apparatus for detecting fluid actuates a signaling device when the fluid in the tube reaches a designated level.

The invention could be utilized in identifying a horizontal plane for suspending a ceiling by aligning the fluid detecting apparatus with a reference point on the proposed horizontal plane. The signaling device is then caused to be actuated when the fluid level in the tube reaches the reference point on the theoretical horizontal plane. The end of the tube at the reference point is known as the reference end. The other end of the tube is referred to as the working end. A worker could locate other points on this proposed horizontal plane by raising the working end of the tube until the signaling apparatus is actuated. By observing the fluid level in the working end when the signal is given, the worker knows that he will have identified another point on the theoretical horizontal plane. This process is repeated until a sufficient number of points have been located to enable the worker to suspend the ceiling accurately. A similar porcedure could be utilized in locating a theoretical horizontal plane for a swimming pool, a house foundation, a sewer line, and countless other applications.

The apparatus for detecting fluid level at the reference end of the tube could be of a multitude of different known designs, all of which are deemed within the broad scope of the invention. For example, two separated electrical probes could be inserted into the tube. When both probes become submerged by a conductive fluid, electrical current could pass between them, thereby completing an electrical circuit for an energy source and a signaling device. Accordingly, a signal would be given. Alternatively, the probes could be on opposite sides of the tube and an electrically condutive fluid or float on the fluid surface could complete the circuit between the probes when the fluid reaches the designated level. In another embodiment of the invention, a light source and light detector are placed on opposite sides of the tube and an opaque fluid or float would interrupt the light beam, thereby actuating the signaling device.

The foregoing fluid sensing devices have been set forth to demonstrate there are a multitude of different methods which may be employed to sense the fluid level at the reference end. All of such methods are deemed within the broad scope of this invention.

The level indicator could be equipped with clips or screws to enable it to be readily mounted to a reference point. Alternatively, in a preferred embodiment of the invention, the device is placed on a vertically adjustable stand, such as a camera tripod, threby permitting it to be readily positioned at the desired height.

In certain construction projects, the reference point may be remotely located from the working end of the tube. For example, the working end may be separated from the reference end by a wall or stairway and thus lie beyond one's range of vision or hearing. In such cases, it would be impossible to see a visual signal or hear an audio signal from the reference end. In a preferred embodiment of the invention, the signaling device is a separate unit which communicates with the fluid level sensing apparatus by radio or wire. The wire could, for convenience, be attached to the flexible tube. Accordingly, the worker could conveniently carry the signaling device with him at the working end of the tube. Sine the fluid will seek its own level, the accuracy of the devide will not be adversely affected by passing the tube under or around obstructions or corners.

BRIEF DESCRIPTION OF THE DRAWING

In the drawings

FIG. 1 is a Side View of a level indicator in partial section, also showing a flexible tube.

FIG. 2 is a Side View of a level indicator in partial section, with a valve.

FIG. 3 is a Side View of a level indicator affixed to a wall with the flexible tube extended.

FIG. 4 is a diagram of a means for detecting a fluid level, detailing the inclusion of a transistorized amplifier.

FIG. 5 is a Front View of a level indicator wherein the course of the tube is disclosed.

FIG. 6 is a side view of a level indicator in partial section, showing a flexible tube and signaling device at the working end of the tube.

DETAILED DESCRIPTION

A level indicator 10 is shown generally in FIG. 1. A tube 11 which is partially filled with fluid is inserted into a means for detecting a fluid level. The means disclosed in FIG. 1 include an electrical energy source 12, which is in series with a signaling device such as a lightbulb and/or horn 13, a first electrical probe 14 and a lower second electrical probe 15. The first 14 and second 15 electrical probes are inserted into the tube 11. The two probes 14 and 15 do not contact each other. A marking 16 on the exterior of the level indicator 10 is aligned with the first electrical probe 14. When an electrically conductive fluid in the tube 11 has submerged the second electrical probe 15 and reaches the level of the first electrical probe 14, an electrical circuit will be completed. Current from the electrical source 12 is thereby permitted to actuate the signaling device 13 and a signal is given. It may be noted that the signal will be triggered when the fluid level in the tube 11 reaches the height of the marking 16.

If one were seeking to establish a horizontal plane for suspending a ceiling, the marking 16 would be aligned with one point on the horizontal plane. The level indicator 10 could be equipped with clips, screws or suction cups to permit it to be readily affixed to a wall for this purpose. The worker could identify an infinite number of points on the proposed horizontal plane by raising the working end of the tube 11 until the signaling device 13 is actuated. To assure precision, the worker may lower the working end of the tube until the signal is no longer given and then slowly raise the working end of the tube again. This process could be repeated until the signal is caused to flicker. When this occurs, the worker could be assured that the fluid at the working end aligns with another point on the horizontal plane.

FIG. 2 reveals an embodiment of the invention similar to FIG. 1, with the exception that a second electrical probe 15 is replaced by metal valve 15'. This valve 15' consists of a metal valve body which can block the flow of fluid during periods of non-use when the valve is turned off. This valve 15' is connected to the energy source 12. Since the metal valve 15' is conductive it will serve the same function as the second electrical probe 15 of FIG. 1.

The operation of this apparatus is shown in FIG. 3, wherein the level indicator 10 is affixed to the wall 17 of a room. The marking 16 is aligned with a reference point on a proposed horizontal plane, shown on line 18. The working end of the tube 11 is shown extended to the far side of the wall 17. The signaling device 13 will be actuated when the fluid level in the working end of the tube aligns with the reference point on the horizontal line 18.

It may be noted that the accuracy of this device will not be adversely affected if some of the fluid inadvertently spills out of the tube or if temperature changes, such as sunlight, cause the fluid to expand or contract.

In another application of the invention, the means for detecting a fluid level may consist of a light source and light detector on opposite sides of the tube at the height of the reference marking 16. The fluid used in this embodiment must be opaque. Alternatively, an opaque float may be used. When the fluid or float reaches the level of the light beam, the beam in interrupted. This interruption would cause a signaling device to be actuated. The circuitry for such light sources and detectors is well known to the art and is not set forth herein.

In other embodiments of the invention, mechanical means for detecting the fluid level may be employed. Such mechanical means may be actuated by a flotation device on the surface of the fluid. For example, such flotation devices could trip a mercury switch, close dry switch contacts, or raise a magnet to activate a magnet switch.

It may be noted that the previously described embodiments which require the electric current to pass through a fluid have a shortcoming in that sufficiently conductive fluids may be economically impractical. For example, tap water may not be sufficiently conductive for current to actuate a light bulb, yet it would conduct a low current. This low current can be amplified by a transistorized circuit as shown in FIG. 4. It may be noted that the tube 11, the energy source 12, the signaling device 13, the first electrical probe 14 and the second electrical probe 15 in FIG. 4 correspond to parts previously identified in FIG. 1. When probe 15 is submerged by the fluid in tube 11, and the fluid surface rises to contact probe 14, a minute current will pass through a fluid such as tap water. A transistorized amplifier 19, as shown in FIG. 4, is designed to be sufficiently sensitive to detect this minute current flowing into the signal input terminal 20. When this minute current is detected, transistorized amplifier 19 delivers current from energy source 12 through the signal output terminal 21 to the signaling device 13, thereby actuating the lightbulb and/or aural signal. The energy source 12 is connected to the power supply terminal 22 and ground terminal 23 of said transistorized amplifier 19.

There are a multitude of different fluid level sensing devices known to the art. It may be noted that any such method when used in connected with the subject apparatus, is within the broad scope of this invention.

The working and reference ends of the tube may be equipped with check valves which prevent the loss of fluid when either end falls below the fluid level.

In certain construction applications, the reference point may be separated from the working end of the tube by walls, corridors, stairways, or other obstructions. In such cases, the reference end may be beyond one's range of vision or hearing when stationed at the working end. Accordingly, it may be convenient to have a signaling device situated at the working end of the tube. The signaling device may be actuated by a radio or wire message which originates in the electrical circuit previously described. As shown in FIG. 6, the signaling device 13' is shown at the working end of tube 11. In all other respects FIG. 6 is the same as FIG. 1. In FIG. 6 the wiring to the signaling device 13' follows the tube 11. In another preferred embodiment, a radio message may be transmitted from the level indicator 10 to the signaling device 13' at the working end of tube 11, thereby obviating the necessity of the wires to the signaling device 13' as shown in FIG. 6. Since methods of such radio communication are well known to the art, the same are not set forth herein. If a wire is utilized, it may conveniently be affixed to the flexible tube and thereby be extended to the working end.

As previously indicated, the level indicator may be equipped with clips, screws or suction cups which enable it to be affixed to a wall or a structure. In certain applications it may be more expedient to place a level indicator upon a vertically adjustable stand, such as a camera tripod.

If, during operations, the working end of the tube is raised too high, the fluid may be caused to spill out of the reference end. Means for preventing such overflow from contacting the electrical circuitry should be provided. Such means are disclosed in FIG. 5, wherein tube 11 is shown to curve upward inside the level indicator 10 and then exit on the side near the top of the said level indicator 10. In this manner, any fluid overflow will be caused to exit the level indicator 10, and certainly should not contact the electrical circuitry.

What is claimed is:

1. A level indicator which comprises:
   A. A tube which is partially filled with fluid (,):
   B. A means for detecting a fluid level to which one end of said tube is attached and which comprises the following elements:
      i. A transistorized amplifier having a signal input terminal, a signal output terminal, a power supply terminal and a ground terminal;
      ii. An energy source connected to the power supply and ground terminals of said transistorized amplifier;
      iii. A first electrode, within said tube, connected to the signal input terminal of said transistorized amplifier;
      iv. A second electrode which would contact the fluid below the first electrode and would be connected to the ground terminal of said transistorized amplified;
      v. An electrically conductive fluid in said tube which would complete a circuit between the first and second electrodes when the fluid reaches the level of (the) a reference point marking;
      vi. An exterior surface on said means for detecting a fluid level;
   C. A signaling device connected to said signal output terminal and actuated by said means for detecting a fluid level; and
   D. A reference point marking on the exterior surface of said means for detecting a fluid level which aligns with the fluid level at the first electrode where said signaling device is actuated.

2. A level indicator of claim 1 further characterized in that said signaling device emits an audible signal.

3. A level indicator of claim 1 further characterized in that said signaling device emits a visual signal.

4. a level indicator of claim 1 further characterized in that said signaling device is a separate unit from said means for detecting a fluid level and is actuated by a wire message from said means for detecting a fluid level.

5. A level indicator of claim 1 further characterized in that said signaling device is a separate unit from said means for detecting a fluid level and is actuated by a radio message from said means for detecting a fluid level.

* * * * *

UNITED STATES PATENT AND TRADEMARK OFFICE
CERTIFICATE OF CORRECTION

PATENT NO. : 4,434,561

DATED : March 6, 1984

INVENTOR(S) : Michael E. Gaspar

It is certified that error appears in the above-identified patent and that said Letters Patent is hereby corrected as shown below:

Column 2, line 46, "porcedure" should read -- procedure --.

line 59, "condutive" should read -- conductive --.

Column 3, line 8, "threby" should read -- thereby --.

line 22, "Sine" should read -- Since --.

line 24, "devide" should read -- device --.

Column 4, line 39, "in" should read -- is --.

Column 6, Claim 1, line 5, "fluid (,):" should read -- fluid; --.

line 25, delete "(the)".

Signed and Sealed this

Twenty-first Day of August 1984

[SEAL]

Attest:

Attesting Officer

GERALD J. MOSSINGHOFF

Commissioner of Patents and Trademarks